United States Patent
Tian et al.

(10) Patent No.: US 10,248,611 B2
(45) Date of Patent: Apr. 2, 2019

(54) DATA TRANSMISSION METHOD AND MOBILE TERMINAL

(71) Applicant: GUANGDONG OPPO MOBILE TELECOMMUNICATIONS CORP., LTD., Dongguan (CN)

(72) Inventors: Chen Tian, Dongguan (CN); Fuchun Liao, Dongguan (CN); Jialiang Zhang, Dongguan (CN); Jun Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 38 days.

(21) Appl. No.: 15/253,444

(22) Filed: Aug. 31, 2016

(65) Prior Publication Data
US 2017/0091142 A1   Mar. 30, 2017

(51) Int. Cl.
| G06F 13/42 | (2006.01) |
| G06F 8/65 | (2018.01) |
| G06F 9/455 | (2018.01) |
| G06F 13/40 | (2006.01) |

(52) U.S. Cl.
CPC ............ G06F 13/4286 (2013.01); G06F 8/65 (2013.01); G06F 9/455 (2013.01); G06F 13/4022 (2013.01)

(58) Field of Classification Search
CPC .... G06F 13/4022; G06F 13/4286; G06F 8/65; G06F 9/455
See application file for complete search history.

(56) References Cited

U.S. PATENT DOCUMENTS

| 8,868,796 B1 | 10/2014 | Wojcik et al. |
| 2009/0144455 A1* | 6/2009 | Chen ................. G06F 11/1433 710/8 |
| 2016/0077995 A1* | 3/2016 | Mishra .................. G06F 1/10 710/106 |
| 2016/0124758 A1* | 5/2016 | Wang .................. G06F 1/266 713/100 |

(Continued)

FOREIGN PATENT DOCUMENTS

| CN | 101499053 A | 8/2009 |
| CN | 102880576 A | 1/2013 |
| CN | 103268248 A | 8/2013 |

OTHER PUBLICATIONS

Zheng, Zhixion; Hu, Ailan, Full duplex UART software simulation based on LPC1768 processor, Jun. 30, 2013, Beijing, China.

(Continued)

*Primary Examiner* — Nimesh G Patel
(74) *Attorney, Agent, or Firm* — Hodgson Russ LLP

(57) ABSTRACT

A data transmission method and a mobile terminal include taking bytes of data in universal asynchronous receiver/transmitter (UART) format generated by a mobile terminal, simulating UART ports via GPIO ports of a processor of the mobile terminal, and transmitting the bytes of data in UART format divided in batches to a receiving terminal via the GPIO ports. In transmitting the bytes of data in UART format in divided batches to the receiving terminal via the GPIO ports, the processor of the mobile terminal is in a locked state. The processor is in an unlocked state between two adjacent batches of the data transmitting.

18 Claims, 3 Drawing Sheets

(56) References Cited

U.S. PATENT DOCUMENTS

2016/0259624 A1* 9/2016 Mishra .................... G06F 5/065

OTHER PUBLICATIONS

Bit Banging, Published in Embedded Systems Programming, Dec. 1991.
Can I disable Interrupts on a BBB for a short duration (0.5ms), Webpage, Nov. 24, 2017.
Use of NoInterrupts causes port to close. Issue #654, Webpage, Nov. 24, 2107.

* cited by examiner

… (1, 2)

DATA TRANSMISSION METHOD AND MOBILE TERMINAL

CROSS REFERENCE TO RELATED APPLICATION

This application claims the priority of International Application No. PCT/CN2015/090625 filed Sep. 24, 2015. The entire disclosure of the above application is incorporated herein by reference.

BACKGROUND

Field

The present disclosure relates to mobile terminal field, and more particularly to a data transmission method and a mobile terminal.

Background

In some situations, processors of mobile terminals (such as mobile phones) need to output interface data in multiple types of formats, for example, Inter-Integrated Circuit (I2C), universal asynchronous receiver/transmitter (UART), serial peripheral interface (SPI), and so on. However, in a situation that number of dedicated interfaces of a processor is not sufficient, it is required to utilize general purpose input/output (GPIO) ports to simulate other types of interfaces. Meanwhile, the processor is necessary to control when data and clocks are transmitted or received by time delays. For I2Cs and SPIs which are synchronous data, accuracy of the time delays is not required. Data transmission and reception can be accurately completed via clock triggers as long as the clocks can keep up with the data. However, for UARTs which is an asynchronous communication, the data is collected via the time delays after a receiving terminal detects a starting bit. When the time delays are not accurate, the data is easily wrongly received. Accordingly, the accuracy of the time delays is quite important for the GPIO ports which simulate UART serial ports.

A processor of the mobile terminal can process multiple types of tasks. However, in order to ensure the accuracy of the time delays, it is required to lock the processor to be protected from all interrupting responses. This ensures that the processor does not process other tasks due to other interrupts when a time delay function is operated. As such, another problem is caused. If data, which is transmitted by the simulated UART serial ports takes too long, it is necessary to lock the processor for a long time. Finally, the processor crashes because it is too late to process various interrupts.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and those skilled in the art may still derive other drawings from these accompanying drawings without creative efforts.

DETAILED DESCRIPTION OF THE PREFERRED EMBODIMENTS

A clear and complete description of technical solutions provided in the embodiments of the present disclosure will be given below, in conjunction with the accompanying drawings in the embodiments of the present disclosure. Apparently, the embodiments described below are merely a part, but not all, of the embodiments of the present disclosure. All of other embodiments, obtained by those skilled in the art based on the embodiments of the present disclosure without any inventive efforts, fall into the protection scope of the present disclosure.

Figure 1:
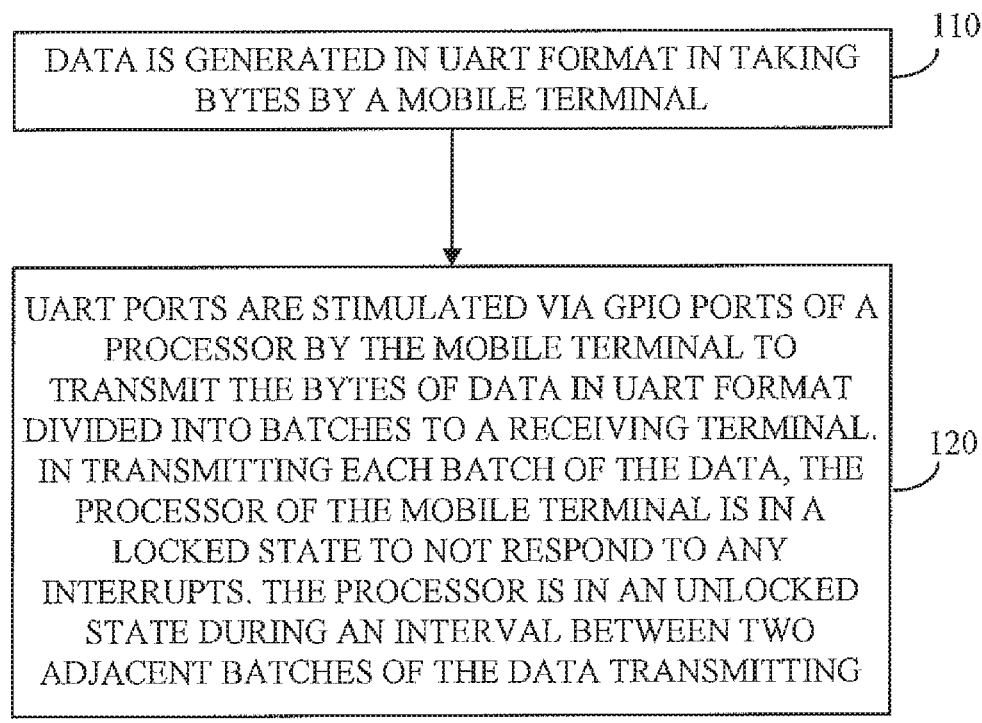
FIG. 1 is a schematic flowchart of a data transmission method in accordance with an embodiment of the present disclosure.

FIG. 1 is a schematic flowchart of a data transmission method in accordance with an embodiment of the present disclosure. The method in FIG. 1 can begin at block 110.

At block 110, data is generated in UART format in taking bytes by a mobile terminal.

At block 120, UART ports are stimulated via GPIO ports of a processor by the mobile terminal to transmit the bytes of data in UART format divided into batches to a receiving terminal. In transmitting each batch of the data, the processor of the mobile terminal is in a locked state to not respond to any interrupts. The processor is in an unlocked state during an interval between two adjacent batches of the data transmitting.

In the embodiment of the present disclosure, the GPIO ports of the processor of the mobile terminal simulate the UART ports to transmit the data in UART format in divided batches to the receiving terminal. During the data transmission, the processor is set to be in the locked state to not respond to other interrupts to ensure stability of the data transmission. Between two batches of the data transmitting, the processor is set to be in the unlocked state to process other tasks or interrupts, thereby avoiding crashes caused when an AP is in the locked state for a long time.

In at least one embodiment, at block 120, a predetermined number of data bytes is acquired by the mobile terminal. The UART ports are simulated via the GPIO ports of the processor to transmit the predetermined number of data bytes to the receiving terminal. The processor is controlled to be in the locked state. The interval is maintained between every two adjacent batches of data bytes transmitting process until all the predetermined number of data bytes in UART format has been transmitted to the receiving terminal. The processor is in the unlocked state during the interval.

In the related art, some adapters are smart adapters which have MCUs. However, the power adapters do not comprise radio frequency modules. Once the power adapters have bugs or are required to be updated, the power adapters can only be returned to factories. As such, it is time consuming and effort consuming In at least one embodiment, the receiving terminal is a power adapter. The mobile terminal is in electrical connection with the power adapter via a charging interface. At block 110, software update information of the power adapter is downloaded by the mobile terminal, and the software update information is converted into the data in UART format by the mobile terminal At block 120, the UART ports are simulated via the GPIO ports of the processor by the mobile terminal to transmit the data in UART format to UART ports of the MCU of the power adapter in batches.

In the embodiment of the present disclosure, the update information of the power adapter is downloaded via the mobile terminal, and then the update information in the data in UART format is transmitted to the UART ports of the processor of the power adapter (other dedicated ports of the MCU of the power adapter are generally occupied, and the UART ports are not utilized sufficiently yet), thereby implementing the update of the power adapter.

In at least one embodiment, the simulating the UART ports via the GPIO ports of the processor by the mobile terminal to transmit the data in UART format to the UART ports of the MCU of the power adapter in batches may include transmitting the data in UART format to the MCU of the power adapter by the mobile terminal in a process where the power adapter charges the mobile terminal in a common charging mode. The method in FIG. 1 may further include switching the mobile terminal from the common charging mode to a quick charging mode after the power adapter updates the software of the power adapter according to the data in UART format, where a charging rate of the quick charging mode is greater than a charging rate of the common charging mode.

In the embodiment of the present disclosure, the download and the update of the power adapter are achieved on the premise of ensuring that the mobile terminal is charged.

In at least one embodiment, the processor of the mobile terminal is an application processor of the mobile terminal.

The mobile terminal may include the application processor and an MCU (or a baseband processor). The application processor can implement functions of a smart mobile terminal, for example, installation and process of an APP. The MCU can process basic functions related to communication, for example, a call, a short message, and so on.

In at least one embodiment, the method in FIG. 1 may further include simulating the UART ports via the GPIO ports by the mobile terminal to receive data in UART format in divided batches from the receiving terminal In receiving each batch of the data, the processor of the mobile terminal is in the locked state to not respond to any interrupts. The processor is in the unlocked state during an interval between two adjacent batches of the data receiving.

The data reception is a reverse process of the data transmission. The details can refer to the process of the data transmission and are not described herein.

The data transmission method in accordance with an embodiment of the present disclosure will be described in detail in combination with the following specific example.

Figure 2:
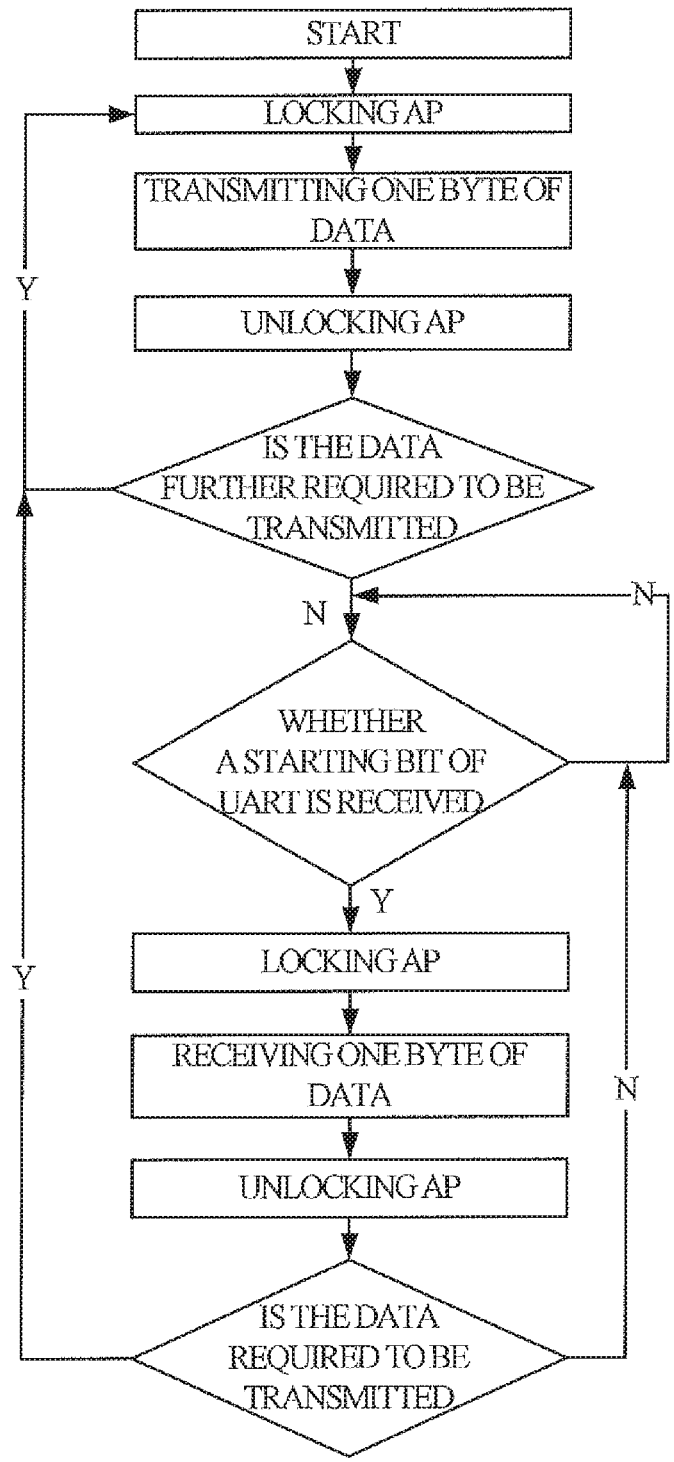
FIG. 2 is an example of the data transmission method in accordance with an embodiment of the present disclosure.

FIG. 2 illustrates an example of the processor of the mobile terminal being an application processor (AP). It can be seen from FIG. 2 that the AP transmits 1 byte of data every time. In the process of transmitting the 1 byte of data, the AP is in a locked state to not respond to any interrupts. In the period of time after the transmission of the one byte of data is completed and before the transmission of a next byte of data starts, the AP is in an unlocked state and can process other tasks, thereby avoiding crashes caused when the AP is in the locked state for a long time and cannot respond to other terminals.

The data transmission method in accordance with the embodiment of the present disclosure is described in detail above in combination with FIG. 1 to FIG. 2. Mobile terminals in accordance with embodiments of the present disclosure are described in detail in the following in combination with FIG. 3 to FIG. 4. It should be understood that the mobile terminals in FIG. 3 to FIG. 4 can implement each of the steps in FIG. 1 to FIG. 2 which are not repeated herein to avoid repetition.

Figure 3:
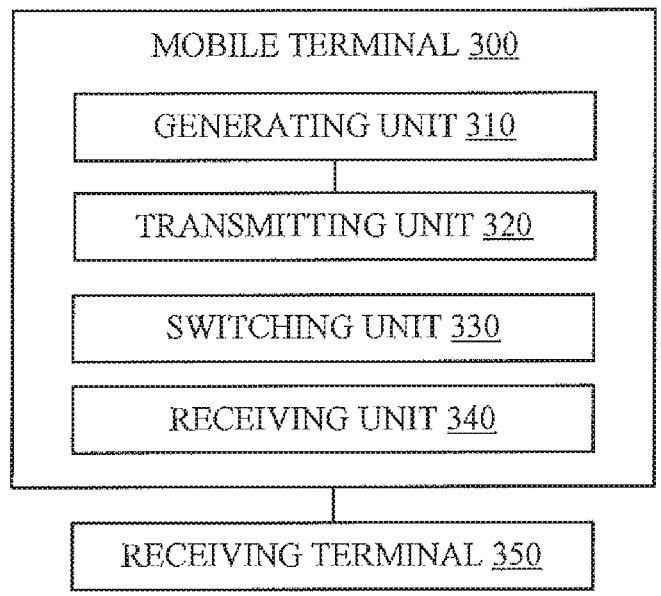
FIG. 3 is an illustrative block diagram of a mobile terminal in accordance with an embodiment of the present disclosure.

FIG. 3 is an illustrative block diagram of a mobile terminal in accordance with an embodiment of the present disclosure. The mobile terminal 300 in FIG. 3 includes a generating unit 310 and a transmitting unit 320. The generating unit 310 is configured to generate data in UART format in taking bytes. The transmitting unit 320 is configured to simulate UART ports via GPIO ports of a processor to transmit the bytes of data in UART format divided into batches to a receiving terminal 350. In transmitting each batch of the data, the processor of the mobile terminal 300 is in a locked state to not respond to any interrupts. The processor is in an unlocked state during an interval between two adjacent batches of the data transmitting.

In the embodiment of the present disclosure, the GPIO ports of the processor of the mobile terminal 300 simulate the UART ports to transmit the data in UART format in divided batches to the receiving terminal 350. During the data transmission, the processor is set to be in the locked state to not respond to other interrupts to ensure the stability of the data transmission. Between two bathes of the data transmitting, the processor is set to be in the unlocked state to process other tasks or interrupts, thereby avoiding crashes caused when the AP is in the locked state for a long time.

In at least one embodiment, the transmitting unit 320 may be specifically configured to acquire a predetermined number of data bytes, simulate the UART ports via the GPIO ports of the processor to transmit the predetermined number of the data bytes to the receiving terminal 350, and maintain the interval between every two adjacent batches of data bytes transmitting process until all the predetermined number of data bytes in UART format has been transmitted to the receiving terminal 350. The processor is in the unlocked state during the interval.

In at least one embodiment, the receiving terminal 350 is a power adapter. The mobile terminal 300 is in electrical connection with the power adapter via a charging interface. The generating unit 310 may be specifically configured to download software update information of the power adapter by the mobile terminal 300 and convert the software update information into the data in UART format. The transmitting unit 320 may be specifically configured to simulate the UART ports via the GPIO ports of the processor by the mobile terminal 300 to transmit the data in UART format to UART ports of an MCU of the power adapter in divided batches.

In at least one embodiment, the transmitting unit 320 may be specifically configured to transmit the data in UART format to the MCU of the power adapter in divided batches in a process where the power adapter charges the mobile terminal 300 in a common charging mode. The mobile terminal 300 further includes a switching unit 330 which is configured to switch from the common charging mode to a quick charging mode after the power adapter updates the software of the power adapter according to the data in UART format. A charging rate of the quick charging mode is greater than a charging rate of the common charging mode. The mobile terminal 300 further includes a receiving unit 340 which is configured to receive data divided in UART format into batches from the receiving terminal 350 via the GPIO ports after the transmitting unit 320 is configured to cause the processor to simulate the UART ports via the GPIO ports of the processor.

In at least one embodiment, the processor of the mobile terminal 300 is an application processor of the mobile terminal 300.

Figure 4:
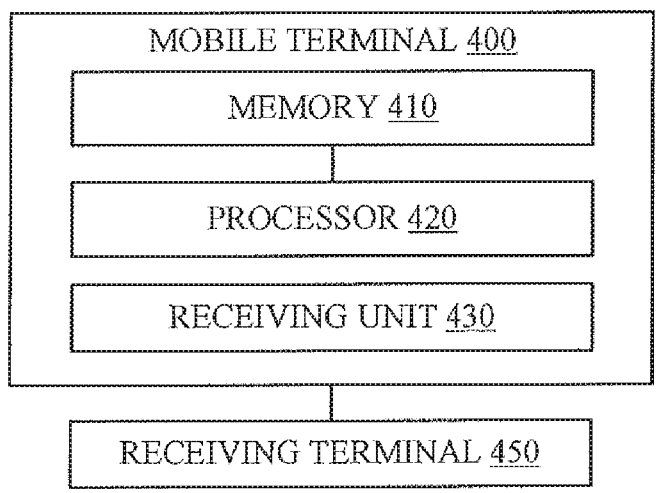
FIG. 4 is an illustrative block diagram of a mobile terminal in accordance with an embodiment of the present disclosure.

FIG. 4 is an illustrative block diagram of a mobile terminal in accordance with an embodiment of the present disclosure. The mobile terminal 400 in FIG. 4 includes a memory 410 and a processor 420. The memory 410 is configured to store programs. The processor 420 is configured to perform the programs. When the programs are performed, the processor 420 is specifically configured to generate data in UART format in taking bytes and simulate UART ports via GPIO ports of the processor 420 to transmit the bytes of data in UART format divided into batches to a receiving terminal 450. In transmitting each batch of the data, the processor 420 of the mobile terminal 400 is in a locked state to not respond to any interrupts. The processor 420 is in an unlocked state during an interval between two adjacent batches of the data transmitting.

In the embodiment of the present disclosure, the GPIO ports of the processor 420 of the mobile terminal 400 simulate the UART ports to transmit the data in UART format in divided batches to the receiving terminal 450. During the data transmission, the processor 420 is set to be in the locked state to not respond to other interrupts to ensure the stability of the data transmission. Between two batches of the data transmitting, the processor 420 is set to be in the unlocked state to process other tasks or interrupts, thereby avoiding crashes caused when the AP is in the locked state for a long time.

In at least one embodiment, the processor 420 may be specifically configured to acquire a predetermined number of data bytes, simulate the UART ports via the GPIO ports of the processor 420 to transmit the predetermined number of data bytes to the receiving terminal 450, and maintain the interval between every two adjacent batches of data bytes transmitting process until all the predetermined number of data bytes in UART format has been transmitted to the receiving terminal 450. The processor 420 is in the unlocked state during the interval.

In at least one embodiment, the receiving terminal 450 is a power adapter. The mobile terminal 400 is in electrical connection with the power adapter via a charging interface. The processor 420 may be specifically configured to download software update information of the power adapter by the mobile terminal 400 and convert the software update information into the data in UART format. The mobile terminal 400 simulates the UART ports via the GPIO ports of the processor 420 to transmit the data in UART format to UART ports of an MCU of the power adapter in divided batches.

In at least one embodiment, the processor 420 may be specifically configured to transmit the data in UART format to the MCU of the power adapter in batches in a process where the power adapter charges the mobile terminal 400 in a common charging mode. The mobile terminal 400 is further configured to switch from the common charging mode to a quick charging mode after the power adapter updates the software of the power adapter according to the data in UART format. A charging rate of the quick charging mode is greater than a charging rate of the common charging mode.

In at least one embodiment, the processor 420 of the mobile terminal 400 is an application processor of the mobile terminal. The mobile terminal 400 further includes a receiving unit 430 which is configured to receive data in UART format divided into batches from the receiving terminal 450 via the GPIO ports after the processor 420 simulates the UART ports via the GPIO ports of the processor 420.

Those skilled in the art may realize that the units and algorithmic steps of the examples described in conjunction with the embodiments disclosed in the present disclosure may be realized by electronic hardware or the combination of computer software and electronic hardware. Whether these functions are executed in a hardware or software method depends on the specific applications and design constraint conditions of the technical solution. For each specific application, the described functions may be realized by professionals using different methods, but this realization shall not be considered as going beyond the scope of the present disclosure.

It should be appreciated by those skilled in the art that for the purpose of convenience and clarity, the specific operational processes of the above-mentioned systems, devices, and units can refer to the corresponding processes in the above-mentioned embodiments of the methods and are not repeated herein.

It should be appreciated that the disclosed systems, devices, and methods in the embodiments provided by the application can be implemented by other methods. For example, the above-mentioned described embodiments of the devices are merely illustrative. For example, the division of the units is only a logic function division, and other division methods may be adopted in practice. For example, a plurality of units or components may be combined or integrated in another system, or some features may be omitted or are not executed. In addition, the displayed or discussed mutual coupling or direct coupling or communication connection may be indirect coupling or communication connection through some interfaces, and the indirect coupling or communication connection may be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments may be fulfilled by selecting part of or all of the units according to actual needs.

In addition, in various embodiments of the present disclosure, the functional units may be integrated in one processing unit, or the function units may separately and physically exist, or two or more units may be integrated in one unit.

When the integrated unit is realized in the form of software functional units and sold or used as independent products, the integrated unit may be stored in a computer-readable storage medium. Based on such an understanding, the technical solution of the present disclosure substantially, or the part of the present disclosure making contribution to the prior art, or all or a part of the technical solution may be embodied in the form of a software product, and the computer software product is stored in a storage medium, which includes a plurality of instructions enabling computer equipment (which may be a personal computer, a server, or network equipment and the like) to execute all of or part of the steps in the methods of the embodiments of the present disclosure. The aforementioned storage medium includes various media capable of storing program codes, such as a U disk, a mobile hard disk, a read-only memory (ROM, Read-Only Memory), a random access memory (RAM, Random Access Memory), a disk or an optical disk.

The above description is merely the specific embodiments of the present invention, but the protection scope of the present invention is not limited thereto, any skilled who is familiar with this art could readily conceive variations or substitutions within the disclosed technical scope disclosed by the present invention, and these variations or substitutions shall be encompassed in the protection scope of the present invention. Thus, the protection scope of the present invention shall be subjected to the protection scope of the claims.

What is claimed is:

1. A data transmission method, comprising:
generating, by a mobile terminal, bytes of data in universal asynchronous receiver/transmitter (UART) format, wherein the data in UART format comprises software update information for a receiving terminal, and the mobile terminal comprises a processor; and
simulating UART ports via general purpose input/output (GPIO) ports of the processor and transmitting the bytes of data in UART format divided into batches to the receiving terminal via the GPIO ports,
wherein when transmitting the bytes of data in UART format in divided batches to the receiving terminal via the GPIO ports, the processor of the mobile terminal is in a locked state,
wherein the processor is in an unlocked state during an interval between two adjacent batches of the data transmitting, and
wherein the receiving terminal is a power adapter, and the mobile terminal is in electrical communication with the power adapter via a charging interface.

2. The method of claim 1, wherein simulating the UART ports via the GPIO ports of the processor and transmitting the bytes of data in UART format in divided batches to the receiving terminal via the GPIO ports comprises:
acquiring a predetermined number of data bytes in UART format to be transmitted;
simulating the UART ports via the GPIO ports of the processor and transmitting the predetermined number of data bytes to the receiving terminal via the GPIO ports in divided batches; and
maintaining the interval between every two adjacent batches of data bytes transmitting process until all the predetermined number of data bytes in UART format has been transmitted to the receiving terminal, wherein the processor is in the unlocked state during the interval.

3. The method of claim 1, wherein taking bytes of data in UART format generated by the mobile terminal comprises:
downloading the software update information of the power adapter by the mobile terminal; and
converting the software update information into the data in UART format.

4. The method of claim 3, wherein transmitting the bytes of data in UART format in divided batches to the receiving terminal via the GPIO ports comprises:
transmitting the bytes of data in UART format to UART ports of a microcontroller (MCU) of the power adapter in batches.

5. The method of claim 4, wherein simulating the UART ports via the GPIO ports of the processor and transmitting the bytes of data in UART format in divided batches to the UART ports of the MCU of the power adapter is performed when the power adapter charges the mobile terminal in a common charging mode.

6. The method of claim 5, further comprising:
switching the mobile terminal from the common charging mode to a quick charging mode after the power adapter updates software of the power adapter according to the bytes of data in UART format,
wherein a charging rate of the quick charging mode is greater than a charging rate of the common charging mode.

7. The method of claim 1, wherein the processor of the mobile terminal is an application processor of the mobile terminal.

8. The method of claim 1, further comprising:
receiving data in UART format divided into batches from the receiving terminal via the GPIO ports after simulating the UART ports via the GPIO ports of the processor,
wherein in receiving the data in UART format in divided batches from the receiving terminal via the GPIO ports of the processor, the processor of the mobile terminal is in the locked state,
the processor is in the unlocked state during an interval between two adjacent batches of the data receiving.

9. The method of claim 1, wherein the processor processes at least one interrupt during the interval between the two adjacent batches of the data transmitting.

10. A mobile terminal, comprising:
a processor; and
a memory connected with the processor, the memory comprising a plurality of programs executable by the processor, the plurality of programs comprising:
a generating unit configured to cause the processor to generate bytes of data in UART format, wherein the data in UART format comprises software update information for a receiving terminal; and
a transmitting unit configured to cause the processor to simulate UART ports via general purpose input/output (GPIO) ports of the processor and transmit the bytes of data in UART format divided into batches to the receiving terminal via the GPIO ports,
wherein when the transmitting unit is configured to cause the processor to transmit the bytes of data in UART format in divided batches to the receiving terminal via the GPIO ports, the processor is in a locked state,
wherein the processor is in an unlocked state during an interval between two adjacent batches of the data transmitting, and
wherein the receiving terminal is a power adapter, and the mobile terminal is in electrical communication with the power adapter via a charging interface.

11. The mobile terminal of claim 10, wherein the transmitting unit is configured to cause the processor to acquire a predetermined number of data bytes in UART format, simulate the UART ports via the GPIO ports of the processor, transmit the predetermined number of the data bytes to the receiving terminal via the GPIO ports in divided batches, and maintain the interval between every two adjacent batches of data bytes transmitting process until all the predetermined number of data bytes in UART format has been transmitted to the receiving terminal,
when the processor is in the unlocked state during the interval.

12. The mobile terminal of claim 10, wherein the generating unit is configured to cause the processor to download the software update information of the power adapter and convert the software update information into the data in UART format.

13. The mobile terminal of claim 12, wherein the transmitting unit is configured to cause the processor to transmit the bytes of data in UART format to UART ports of a microcontroller (MCU) of the power adapter in batches.

14. The mobile terminal of claim 13, wherein the transmitting unit is configured to cause the processor to simulate the UART ports via the GPIO ports of the processor and transmit the bytes of data in UART format in divided batches to the UART ports of the MCU of the power adapter when the power adapter charges the mobile terminal in a common charging mode.

15. The mobile terminal of claim 14, further comprising:
a switching unit configured to cause the processor to switch the mobile terminal from the common charging mode to a quick charging mode after the power adapter updates software of the power adapter according to the bytes of data in UART format,
wherein a charging rate of the quick charging mode is greater than a charging rate of the common charging mode.

16. The mobile terminal of claim 10, wherein the processor is an application processor of the mobile terminal.

17. The mobile terminal of claim 10, further comprising:
a receiving unit configured to cause the processor to receive data in UART format divided into batches from the receiving terminal via the GPIO ports after the transmitting unit is configured to cause the processor to simulate the UART ports via the GPIO ports of the processor,
wherein when the transmitting unit is configured to cause the processor to receive the data in UART format in divided batches from the receiving terminal via the GPIO ports of the processor, the processor of the mobile terminal is in the locked state,
when the processor is in the unlocked state during an interval between two adjacent batches of the data receiving.

18. The mobile terminal of claim 10, wherein the processor processes at least one interrupt during the interval between the two adjacent batches of the data transmitting.

* * * * *

UNITED STATES PATENT AND TRADEMARK OFFICE
CERTIFICATE OF CORRECTION

PATENT NO. : 10,248,611 B2  
APPLICATION NO. : 15/253444  
DATED : April 2, 2019  
INVENTOR(S) : Tian et al.

Page 1 of 1

It is certified that error appears in the above-identified patent and that said Letters Patent is hereby corrected as shown below:

On the Title Page

Item [30], should read:  
--Sep. 24, 2015 (CN) PCT/CN2015/090625--

Signed and Sealed this  
Twenty-fourth Day of September, 2019

Andrei Iancu  
*Director of the United States Patent and Trademark Office*